(12) United States Patent
Bletsch et al.

(10) Patent No.: US 8,041,521 B2
(45) Date of Patent: Oct. 18, 2011

(54) ESTIMATING POWER CONSUMPTION OF COMPUTING COMPONENTS CONFIGURED IN A COMPUTING SYSTEM

(75) Inventors: Tyler K. Bletsch, Raleigh, NC (US); Ajay Dholakia, Apex, NC (US); Wesley M. Felter, Austin, TX (US); Charles R. Lefurgy, San Marcos, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/946,506

(22) Filed: Nov. 28, 2007

(65) Prior Publication Data

US 2009/0138219 A1    May 28, 2009

(51) Int. Cl.
*G01R 21/00* (2006.01)
*G06F 1/00* (2006.01)
(52) U.S. Cl. .................. 702/60; 702/186; 713/300
(58) Field of Classification Search .......... 702/57, 702/60
See application file for complete search history.

(56) References Cited

U.S. PATENT DOCUMENTS

| | | | |
|---|---|---|---|
| 3,602,703 A | 8/1971 | Polenz | |
| 5,623,450 A | 4/1997 | Phillips et al. | |
| 5,630,148 A | 5/1997 | Norris | |
| 5,719,800 A | 2/1998 | Mittal et al. | |
| 5,745,375 A * | 4/1998 | Reinhardt et al. | 700/286 |
| 5,812,860 A * | 9/1998 | Horden et al. | 713/322 |
| 5,941,991 A | 8/1999 | Kageshima | |
| 6,002,878 A | 12/1999 | Gehman et al. | |
| 6,038,636 A | 3/2000 | Brown, III et al. | |
| 6,125,334 A | 9/2000 | Hurd | |
| 6,141,021 A | 10/2000 | Bickford et al. | |
| 6,385,113 B1 | 5/2002 | Longwell et al. | |
| 6,513,145 B1 | 1/2003 | Venkitakrishnan | |
| 6,624,816 B1 | 9/2003 | Jones, Jr. | |

(Continued)

FOREIGN PATENT DOCUMENTS

WO    WO 2005/069148    7/2005

(Continued)

OTHER PUBLICATIONS

Watts, John M., Jr. and Robert E. Chapman, "Engineering Economics", Section 5, Chapter 7, SFPE Handbook of Fire Protection Engineering, NFPA, Quincy MA, 2002.*

(Continued)

*Primary Examiner* — Jonathan Teixeira Moffat
(74) *Attorney, Agent, or Firm* — H. Barrett Spraggins; Cynthia G. Seal; Biggers & Ohanian, LLP

(57) ABSTRACT

Methods, apparatus, and products as disclosed for estimating power consumption of computing components configured in a computing system that include: selecting, by a power estimation module, a plurality of calibration datasets from a calibration dataset repository, each calibration dataset specifying calibration power consumption by one or more computing components in the computing system for a calibration workload at a plurality of calibration operating points; measuring, by the power estimation module, a current power consumption by one or more measured computing components in the computing system for a current workload at a current operating point; determining, by the power estimation module, an estimated power consumption for the measured computing components at a proposed operating point in dependence upon the selected calibration datasets and the current power consumption for the current workload at the current operating point; and administering the computing system in dependence upon the estimated power consumption.

19 Claims, 5 Drawing Sheets

U.S. PATENT DOCUMENTS

| | | |
|---|---|---|
| 6,628,469 B1 | 9/2003 | Hoyt |
| 6,657,634 B1 | 12/2003 | Sinclair et al. |
| 6,661,671 B1 | 12/2003 | Franke et al. |
| 6,665,806 B1 | 12/2003 | Shimizu |
| 6,766,420 B2 | 7/2004 | Rawson, III |
| 6,795,896 B1 | 9/2004 | Hart |
| 6,820,222 B2 | 11/2004 | Swoboda |
| 6,862,672 B1 | 3/2005 | Furudate et al. |
| 6,916,815 B2 | 7/2005 | Vite et al. |
| 7,002,884 B2 | 2/2006 | Schmidt et al. |
| 7,010,656 B2 | 3/2006 | Gupta |
| 7,036,030 B1* | 4/2006 | Altmejd ............... 713/322 |
| 7,043,647 B2 | 5/2006 | Hansen et al. |
| 7,069,463 B2 | 6/2006 | Oh |
| 7,134,011 B2 | 11/2006 | Fung |
| 7,155,621 B2 | 12/2006 | Dai |
| 7,155,623 B2 | 12/2006 | Lefurgy et al. |
| 7,219,241 B2 | 5/2007 | Cooper et al. |
| 7,240,225 B2 | 7/2007 | Brewer et al. |
| 7,284,067 B2 | 10/2007 | Leigh |
| 7,318,164 B2 | 1/2008 | Rawson, III |
| 7,345,689 B2 | 3/2008 | Janus et al. |
| 7,444,526 B2 | 10/2008 | Felter et al. |
| 7,516,348 B1 | 4/2009 | Ofer |
| 7,581,130 B2 | 8/2009 | Carroll et al. |
| 7,788,513 B2 | 8/2010 | Vaden |
| 7,953,990 B2* | 5/2011 | Stewart et al. ............ 713/300 |
| 2001/0032298 A1 | 10/2001 | Emons |
| 2002/0004912 A1 | 1/2002 | Fung |
| 2002/0087896 A1 | 7/2002 | Cline et al. |
| 2002/0133792 A1* | 9/2002 | Raghunathan et al. ........ 716/4 |
| 2003/0051104 A1 | 3/2003 | Woo |
| 2003/0056125 A1 | 3/2003 | O'Conner et al. |
| 2003/0105984 A1 | 6/2003 | Masuyama et al. |
| 2003/0112582 A1 | 6/2003 | Sanders et al. |
| 2003/0117759 A1 | 6/2003 | Cooper |
| 2003/0120772 A1 | 6/2003 | Husain et al. |
| 2003/0125886 A1 | 7/2003 | Spitaels et al. |
| 2003/0188222 A1 | 10/2003 | Abbondanzio et al. |
| 2003/0229821 A1 | 12/2003 | Ma |
| 2004/0003303 A1 | 1/2004 | Oehler et al. |
| 2004/0024831 A1 | 2/2004 | Yang et al. |
| 2004/0030939 A1 | 2/2004 | Barr et al. |
| 2004/0030941 A1 | 2/2004 | Barr et al. |
| 2004/0148060 A1 | 7/2004 | Lee |
| 2004/0243886 A1 | 12/2004 | Klein |
| 2004/0268166 A1* | 12/2004 | Farkas et al. ............. 713/320 |
| 2005/0015632 A1 | 1/2005 | Chheda et al. |
| 2005/0060590 A1 | 3/2005 | Bradley et al. |
| 2005/0060591 A1 | 3/2005 | Yoshiyama et al. |
| 2005/0102544 A1 | 5/2005 | Brewer et al. |
| 2005/0134593 A1 | 6/2005 | Janus et al. |
| 2005/0138438 A1 | 6/2005 | Bodas |
| 2005/0229226 A1* | 10/2005 | Relan et al. ............ 725/114 |
| 2005/0244131 A1 | 11/2005 | Uehara |
| 2005/0262365 A1 | 11/2005 | Lint et al. |
| 2005/0289361 A1 | 12/2005 | Sutardja |
| 2005/0289362 A1 | 12/2005 | Merkin et al. |
| 2005/0289367 A1* | 12/2005 | Clark et al. ............ 713/300 |
| 2006/0007203 A1 | 1/2006 | Chen et al. |
| 2006/0156041 A1 | 7/2006 | Zaretsky et al. |
| 2006/0161794 A1 | 7/2006 | Chiasson et al. |
| 2006/0190745 A1 | 8/2006 | Matsushima et al. |
| 2006/0230299 A1 | 10/2006 | Zaretsky et al. |
| 2006/0248354 A1* | 11/2006 | Pineda De Gyvez et al. 713/300 |
| 2006/0248356 A1 | 11/2006 | Won et al. |
| 2006/0253715 A1 | 11/2006 | Ghiasi et al. |
| 2007/0033425 A1 | 2/2007 | Clark |
| 2007/0073969 A1 | 3/2007 | Guha et al. |
| 2007/0162632 A1 | 7/2007 | Ng et al. |
| 2007/0162692 A1 | 7/2007 | Nishimoto et al. |
| 2007/0162776 A1 | 7/2007 | Carpenter et al. |
| 2007/0245161 A1 | 10/2007 | Shaw et al. |
| 2007/0260897 A1 | 11/2007 | Cochran et al. |
| 2008/0018653 A1 | 1/2008 | Liu |
| 2008/0077817 A1 | 3/2008 | Brundridge et al. |
| 2008/0094403 A1 | 4/2008 | Bakalash et al. |
| 2008/0204460 A1 | 8/2008 | Marinkovic et al. |
| 2008/0229050 A1 | 9/2008 | Tillgren |
| 2008/0320203 A1 | 12/2008 | Fitzgerald |
| 2009/0070611 A1 | 3/2009 | Bower et al. |
| 2009/0089595 A1 | 4/2009 | Brey et al. |
| 2009/0132842 A1 | 5/2009 | Brey et al. |

FOREIGN PATENT DOCUMENTS

| | | |
|---|---|---|
| WO | WO 2007/140404 | 12/2007 |

OTHER PUBLICATIONS

Dhiman et al.; Dynamic Power Management. Using Machine Learning; ICCAD '06; Nov. 2006; ACM 1-59593-389-1/06/0011; San Jose, CA, USA.

Pinheiro, et al.; Load Balancing and Unbalancing for Power and Performance in Cluster-Based Systems; pp. 4-1-4-8; Department of Computer Science, Rutgers University; Piscataway, NJ.

Soteriou, et al.; Software-Directed Power-Aware Interconnection Networks; Department of Electrical Engineering, Princeton University; Sep. 24-27, 2005; pp. 274-285; CASES 2005; Princeton, NJ.

Koyangi et al.; Control of Spindle Motor Velocity in Load/Unload Hard Disk Drive; TDB v38 n12 Dec. 1995 p551-552; AAA95A062553; Japan.

Luecke; High-Speed/Low-Power Selectable Optical File; Research Disclosure n315 07-90; Jul. 1990; AAA90A963914; San Jose.

Otteson; Adaptive Just-In-Time Velocity profile Algorithm for Power Savings in a Direct Access Storage Device; TDB v41 n1 Jan. 1998 p. 733-736; AAA98A060205; Rochester, MN.

Mitchell; Memory: The New Power Hog; www.techworld.com/features/index.cfm?featureID=3337; Apr. 2007.

Pisharath, et al; Reducing Energy Consumption of Queries in Memory-Resident Database Systems; International Conference on Compilers, Architectures and Synthesis of Embedded Systems; Sep. 23, 2004.

Dhiman et al.; Dynamic Power Management Using Machine Learning; ICCAD'06; Nov. 2006; ACM 1-59593-389-1/06/0011; San Jose, CA, USA.

Watts, et al.; Engineering Economics, Section 5, Chapter 7, SFPE Handbook of Fire Protection Engineering, NFPA, Quincy, MA 2002. http://ati.amd.com/technology/hybridgraphics/index.html.

PCT Search Report and Written Opinion, Oct. 21, 2010; PCT Application No. PCT/EP2009/064818.

PCT Search Report, Feb. 22, 2010; PCT Application No. PCT/EP2009/057910.

Compaq Computer Corporation, et al. Advanced Configuration and Power Interface Specification Rev 2.0; Jul. 27, 2000; pp. 1-27 and 211-230.

Office Action, U.S. Appl. No. 11/285,325, Mar. 18, 2008.
Notice of Allowance, U.S. Appl. No. 11/285,325, Jul. 25, 2008.
Office Action, U.S. Appl. No. 11/946,506, Jul. 21, 2009.
Final Office Action, U.S. Appl. No. 11/946,506, Feb. 22, 2010.
Office Action, U.S. Appl. No. 11/946,506, Nov. 28, 2007.
Office Action, U.S. Appl. No. 11/859,829, Apr. 7, 2010.
Office Action, U.S. Appl. No. 11/946,506, Nov. 22, 2010.
Office Action, U.S. Appl. No. 11/940,896, Jun. 29, 2010.
Office Action, U.S. Appl. No. 11/940,896, Dec. 3, 2010.

* cited by examiner

ESTIMATING POWER CONSUMPTION OF COMPUTING COMPONENTS CONFIGURED IN A COMPUTING SYSTEM

BACKGROUND OF THE INVENTION

1. Field of the Invention

The field of the invention is data processing, or, more specifically, methods, apparatus, and products for estimating power consumption of computing components configured in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems and networks today that are much more powerful than just a few years ago.

In order to deliver powerful computing resources, computer architects must design powerful computer processors and high-speed memory modules. Current computer processors, for example, are capable of executing billions of computer program instructions per second. Operating these computer processors and memory modules requires a significant amount of power, and often processors can consume over 100 watts during operation. The power consumption for adaptive components, such as processors and memory modules, however, may vary greatly over time depending on the current workload for which the components are utilized. For example, a relatively idle processor typically consumes less power than a processor that is executing the maximum number of computer program instructions possible. Similarly, a memory module that performs less read/write transactions typically consumes less power than a memory module performing more read/write transactions. Because the power consumption of various computing components in a computing system constantly changes, optimizing the power provided to the computing components becomes increasingly difficult. As such, readers will appreciate any improvements in estimating power consumption of computing components configured in a computing system.

SUMMARY OF THE INVENTION

Methods, apparatus, and products as disclosed for estimating power consumption of computing components configured in a computing system that include: selecting, by a power estimation module, a plurality of calibration datasets from a calibration dataset repository, each calibration dataset specifying calibration power consumption by one or more computing components in the computing system for a calibration workload at a plurality of calibration operating points; measuring, by the power estimation module, a current power consumption by one or more measured computing components in the computing system for a current workload at a current operating point; determining, by the power estimation module, an estimated power consumption for the measured computing components at a proposed operating point in dependence upon the selected calibration datasets and the current power consumption for the current workload at the current operating point; and administering, by the power estimation module, the computing system in dependence upon the estimated power consumption.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
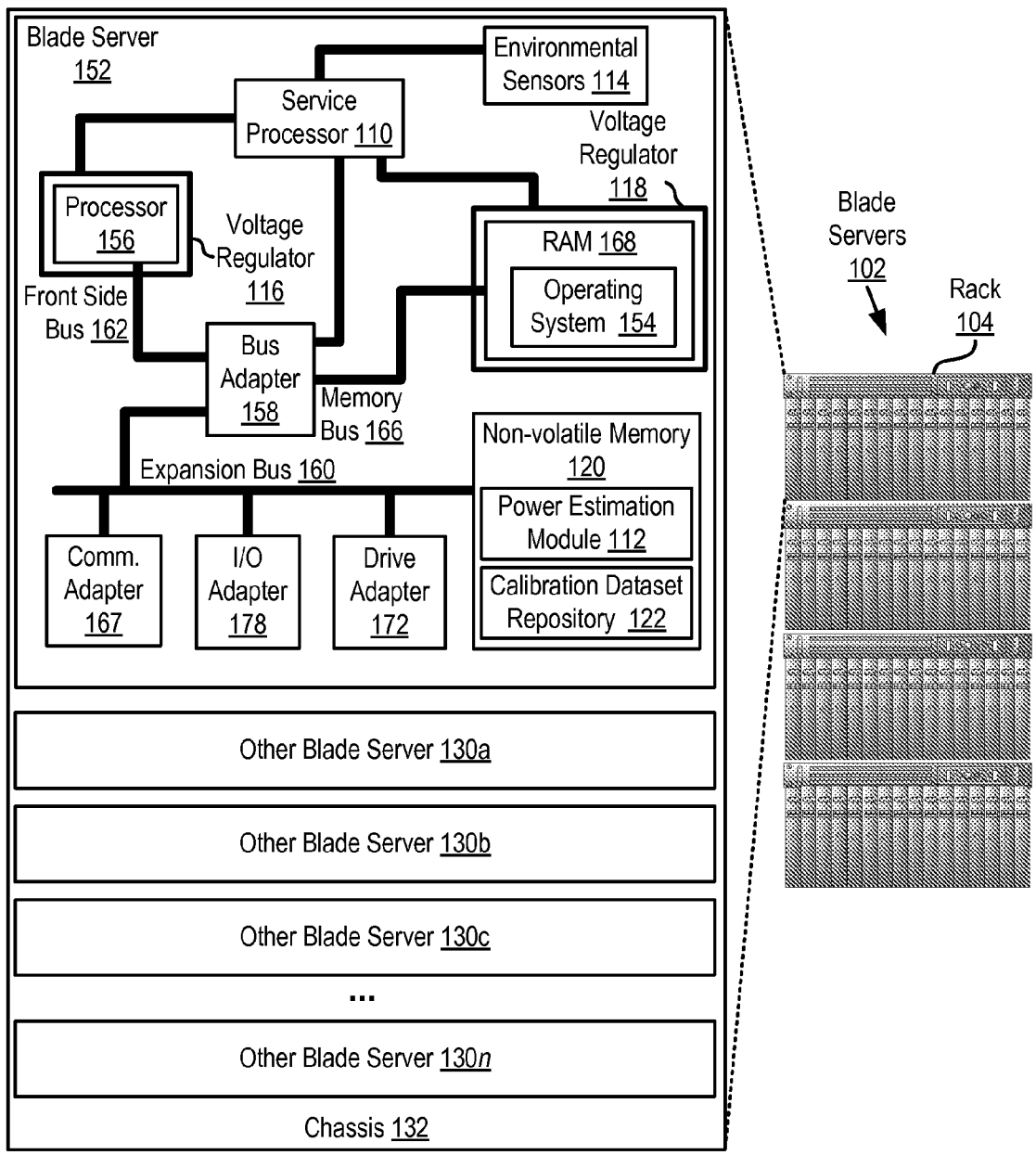
FIG. 1 sets forth a functional block diagram of an exemplary computing system capable of estimating power consumption of computing components configured in the computing system according to embodiments of the present invention.

Exemplary methods, apparatus, and products for estimating power consumption of computing components configured in a computing system in accordance with the present invention are described with reference to the accompanying drawings, beginning with FIG. 1. FIG. 1 sets forth a functional block diagram of an exemplary computing system (152) capable of estimating power consumption of computing components configured in the computing system according to embodiments of the present invention. The exemplary computing system of FIG. 1 is implemented as a blade server (152) among other blade servers (102) housed in a blade server chassis (132), which in turn is installed in a rack (104). Examples of blade server chassis and blade servers that may be improved for estimating power consumption of computing components configured in the computing system according to embodiments of the present invention include IBM's BladeCenter® series of chassis and blade servers, respectively.

The exemplary computing system (152) of FIG. 1 includes a service processor (110). The service processor (110) is used to configure, administer, and test the various computing components included in the exemplary computing system (152). In such a manner, the service processor (110) may provide a variety of functions. For example, the service processor (110) may write to computer memory (168) and then read the contents of the memory (168) to determine if the memory is working properly. The service processor (110) may load an initial program, load initial microcode, verify that memory has been allocated for an application, and identify communication channels which are operable. In addition, the service processor (110) may correct certain failures in components and reset certain functions to correct those failures.

The service processor (110) of FIG. 1 executes a power estimation module (112) stored in non-volatile computer memory (120). The power estimation module (112) is a set of computer program instructions for estimating power consumption of computing components configured in a computing system according to embodiments of the present invention. The power estimation module (112) operates generally for estimating power consumption of computing components configured in a computing system according to embodiments of the present invention by: selecting a plurality of calibration datasets from a calibration dataset repository (122), each calibration dataset specifying calibration power consumption by one or more computing components in the computing system for a calibration workload at a plurality of calibration operating points; measuring a current power consumption by one or more measured computing components in the computing system for a current workload at a current operating point; and determining an estimated power consumption for the measured computing components at a proposed operating point in dependence upon the selected calibration datasets and the current power consumption for the current workload at the current operating point.

An operating point is a state of an operating parameter for a computing system that affects power consumption by one or more components in the computing system. Examples of an operating parameter may include clock frequency of a component, instruction fetch rate limit of processor, instruction issue rate limit of processor, and so on. When an operating parameter is implemented as a processor's clock frequency, exemplary operating points may include 3.0 gigahertz ('GHz'), 3.2 GHz, 3.4 GHz, or 3.6 GHz.

A workload represents the level of data processing performed by a computing system. Lower levels of data processing performed by the computing system correspond to lower levels of computer system resource utilization. Higher levels of data processing performed by the computing system correspond to higher levels of computer system resource utilization. The workload for a computing system is typically determined by the particular algorithm and data being processed by the computing system. Varying the algorithm and data being processed by the computing system typically varies the computing system's workload.

In the example of FIG. 1, the calibration datasets are contained in a calibration dataset repository (122) stored in non-volatile computer memory (120). A calibration dataset is a set of data that specifies power consumption by one or more computing components of a computing system for various operating points. Each calibration dataset corresponds to a particular workload by specifying power consumption while the computer system is operating at various operating points to process a particular workload. A dataset is referred to as a 'calibration dataset' because the dataset was previously generated specifically for the computing components for which power consumption is estimated according to embodiments of the present invention. Although FIG. 1 illustrates the calibration dataset repository (122) in non-volatile computer memory (120), readers will note that the calibration dataset repository (122) may also be stored in RAM (168).

The exemplary system of FIG. 1 includes two voltage regulators (116, 118) used by the service processor (110) to measure the current power consumption by computing components (156, 168). The voltage regulator (116) of FIG. 1 supplies voltage to processor (156), and the voltage regulator (118) supplies voltage to RAM (168). A voltage regulator is an electrical device designed to supply power to a component at a constant voltage level. As the voltage regulators (116, 118) supply a constant voltage to each of the components (156, 168), the voltage regulator (116) of FIG. 1 tracks the current supplied to the processor (156), and the voltage regulator (118) of FIG. 1 tracks the current supplied to RAM (168). The service processor (110) may retrieve the voltage and the current supplied to each component (156, 168) and use that information to calculate the power supplied to each component (156, 168).

Readers will note that the description above with reference to FIG. 1 describes measuring only the current power consumption for the processor (156) and the computer memory (168). Such a description is for explanation only and not for limitation. The current power consumption for any other computing components as will occur to those of skill in the art may also be measured such as, for explanation, bus adapters, I/O adapters, drive adapters, communications adapters, and so on. In fact, in some embodiments the measured component may be entire computing system itself such as, for example, the entire blade server (152) of FIG. 1 may be measured for power consumption.

Although the service processor (110) obtains power consumption data using information supplied directly from the voltage regulators (116, 118) of FIG. 1, readers will note that such an example is for explanation only and not for limitation. The service processor (110) may obtain such power consumption data from other sources. For example, the power consumption data for each of the components (156, 168) may be monitored by some other software module such as, for example, the IBM's PowerExecutive™. In such embodiments, such software may aggregate the power consumption data from the various computing components of the blade server (152), and in turn, provide the power consumption data to the power estimation module (112) running on the service processor (112).

The exemplary computing system (152) of FIG. 1 includes environmental sensors (114). The environmental sensors (114) of FIG. 1 are electronic components used to detect one or more environmental parameters. Environmental parameters describe the physical environment in which the computing system operates. Examples of environment parameters may include ambient temperature, altitude, humidity, and so on. These environmental parameters typically impact the power consumption of the computing components in the computing system (152). As such, the calibration dataset repository (122) may associate each stored calibration dataset with the environmental parameters as measured when each stored calibration dataset was created. The power estimation module (112) may then select the calibration datasets from the calibration dataset repository (122) by selecting calibration datasets associated with environmental parameters that match the current environmental parameters as detected using the environmental sensors (114).

The description above with reference to FIG. 1 describes the power estimation module (112) stored in non-volatile computer memory (120) and executed by the service processor (110). Readers will note that such a description is for explanation only and not for limitation. In fact, the power estimation module may be stored in RAM (168) and executed by the computing system's processor (156). In other embodiments, the power estimation model (112) may be stored or executed by a remote computing system.

Stored in RAM (168) is an operating system (154). Operating systems useful for estimating power consumption of computing components configured in a computing system according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170).

The example computing device (152) of FIG. 1 includes non-volatile computer memory (120) coupled to the other computing components of the computing system (152) through expansion bus (160) and the bus adapter (158). Non-volatile computer memory (120) is computer memory that can retain the stored information even when the memory is not supplied with power. Examples of non-volatile computer memory may include read-only memory ('ROM') or Electrically Erasable Programmable Read-Only Memory ('EEPROM'). Non-volatile computer memory (120) of FIG. 1 may be used to store the power estimation module (112), the calibration dataset repository (122), the Basic Input/Output System ('BIOS') instructions for the system (152), and so on.

The computing device (152) of FIG. 1 includes disk drive adapter (172) coupled through expansion bus (160) and bus adapter (158) to processor (156) and other components of the computing device (152). Disk drive adapter (172) connects non-volatile data storage to the computing device (152) in the form of a disk drive (not shown). Disk drive adapters useful in computing devices for estimating power consumption of computing components configured in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory ('EEPROM' or 'Flash' memory), RAM drives, and so on, as will occur to those of skill in the art.

The example computing device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices such as keyboards and mice that may be accessible through the chassis (132).

The exemplary computing device (152) of FIG. 1 includes a communications adapter (167) that couples the computing device for data communications with other computing devices through a data communications network. Such a data communication network may be implemented with external buses such as a Universal Serial Bus ('USB'), or as an Internet Protocol ('IP') network or an Ethernet™ network, an I²C network, a System Management Bus ('SMBus'), an Intelligent Platform Management Bus ('IPMB'), for example, and in other ways as will occur to those of skill in the art. Communications adapters implement the hardware level of data communications through which one computer sends data communications to another computer, directly or through a data communications network. Examples of communications adapters useful for estimating power consumption of computing components configured in a computing system according to embodiments of the present invention include modems for wired dial-up communications, Ethernet (IEEE 802.3) adapters for wired data communications network communications and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
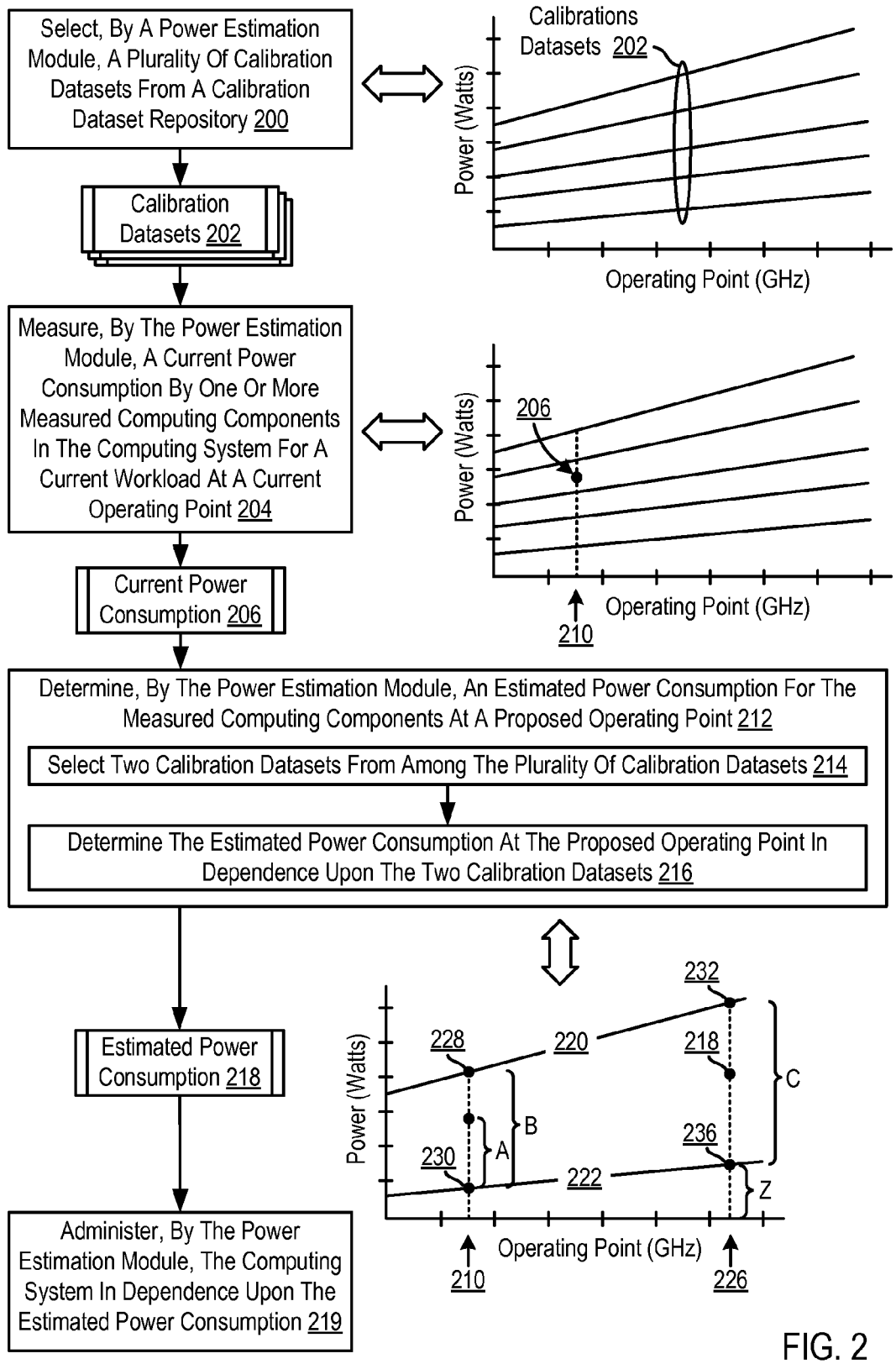
FIG. 2 sets forth a flow chart illustrating an exemplary method of estimating power consumption of computing components configured in a computing system according to embodiments of the present invention.

For further explanation, FIG. 2 sets forth a flow chart illustrating an exemplary method of estimating power consumption of computing components configured in a computing system according to embodiments of the present invention. The method of FIG. 2 includes selecting (200), by a power estimation module, a plurality of calibration datasets (202) from a calibration dataset repository. Each calibration dataset (202) of FIG. 2 specifies calibration power consumption by one or more computing components in the computing system for a calibration workload at a plurality of calibration operating points. Each calibration dataset is represented in FIG. 2 as a solid line in the power-operating point graphs.

The computing system may generate the calibration datasets (202) when the computing system is first powered on. As part of the boot-up process, the computing system may generate a calibration dataset by determining the power consumption at a plurality of operating points while processing a particular workload. The computing system may also generate other calibration datasets for different workloads and store all of the calibration datasets in the calibration dataset repository for later use in estimating power consumption of the computing components configured in the computing system according to embodiments of the present invention. In other embodiments, a computer manufacturer may have previously generated the calibration datasets (202) when the computing system was configured and pre-loaded the calibration datasets (202) into the calibration dataset repository stored computer memory on the computing system.

Each calibration dataset (202) may be stored in the calibration dataset repository as a table, a mathematical function, and so on. For an example of a calibration dataset implemented using a table, consider the following exemplary table:

TABLE 1

| Exemplary Calibration Dataset | |
|---|---|
| Operating Point (GHz) | Power (Watts) |
| 3.0 | 450 |
| 3.2 | 470 |
| 3.4 | 490 |
| 3.6 | 510 |

The exemplary calibration dataset above specifies that for a particular workload, one or more computing components in the computing system consumed 450 Watts at an operating point of 3.0 GHz. The computing components consumed 470 Watts at an operating point of 3.2 GHz. The computing components consumed 490 Watts at an operating point of 3.4 GHz. The computing components consumed 510 Watts at an operating point of 3.6 GHz.

For an example of a calibration dataset implemented using a mathematical formula, consider the following exemplary mathematical formula that specifies the same relationship between power consumption and operating point as the exemplary dataset above:

$$P_{consumed}(f) = \left(\frac{100 \text{ Watts}}{1 \text{ GHz}}\right) \times f + 150 \text{ Watts}$$

where $P_{consumed}$ is the power consumption in Watts at a particular workload and f is the operating point specified as a clock frequency in GHz. The exemplary mathematical formula above may have been originally derived from the exemplary calibration dataset provided in Table 1 above, but the mathematical formula above provides a continuous range of values for power consumption over a continuous range of operating points. Either the exemplary table above or the exemplary mathematical formula above may be stored in the calibration dataset repository. Readers will note that the exemplary table above and the exemplary mathematical formula above are for explanation and not for limitation. Other implementations a calibration dataset are well within the scope of the embodiments of the present invention.

The method of FIG. 2 also includes measuring (204), by the power estimation module, a current power consumption (206) by one or more measured computing components in the computing system for a current workload at a current operating point (210). 'Measured computing components' refer to those components in the computing system for which the current power consumption (206) is measured by the power estimation module. In the example of FIG. 2, the current operating point (210) represents the clock frequency at which the processor in the computing system is currently operating. The current workload represents the level of data processing currently performed by a computing system, which is typically determined by the current algorithm being processed by the computing system.

The power estimation module may measure (204) the current power consumption (206) for a current workload at a current operating point (210) according to the method of FIG. 2 by detecting the voltage and current being supplied to the measured computing components and calculating the power consumed by the measured components as the multiplication of the voltage times the current. The power estimation module may detect the voltage and current being supplied to the measured computing components through the voltage regulator that supplies current to the components at a constant voltage. In some other embodiments, the power estimation module may measure (204) the current power consumption (206) for a current workload at a current operating point (210) according to the method of FIG. 2 by retrieving the current power consumption (206) for the measured components from software that aggregates the power consumption information from the various components of the computing system and provides that power consumption information to the power estimation module.

The method of FIG. 2 also includes determining (212), by the power estimation module, an estimated power consumption (218) for the measured computing components at a proposed operating point (226) for the current workload in dependence upon the selected calibration datasets (220, 222) and the current power consumption (206) for the current workload at the current operating point (210). The power estimation module may determine (212) an estimated power consumption (218) for the measured computing components at a proposed operating point (226) for the current workload according to the method of FIG. 2 by selecting (214) two calibration datasets (220, 222) from among the plurality of calibration datasets (202) and determining (216) the estimated power consumption (218) at the proposed operating point in dependence upon the two calibration datasets (220, 222).

The power estimation module may select (214) two calibration datasets (220, 222) from among the plurality of calibration datasets (202) according to the method of FIG. 2 by selecting, from the plurality of calibration datasets (202), a lower calibration dataset (222) and a higher calibration dataset (220). The lower calibration dataset (222) of FIG. 2 specifies a calibration power consumption (230) that is less than the current power consumption (206) at the calibration operating point matching the current operating point (210). The higher calibration dataset (220) of FIG. 2 specifies the calibration power consumption (228) that is greater than the current power consumption (206) at the calibration operating point matching the current operating point (210).

The power estimation module may determine (216) the estimated power consumption (218) at the proposed operating point in dependence upon the two calibration datasets (220, 222) according to the method of FIG. 2 by calculating the calibration power consumption (230) specified by the lower calibration dataset (222) at the calibration operating point matching the current operating point (210), calculating the calibration power consumption (236) specified by the lower calibration dataset (222) at the calibration operating point matching the proposed operating point (226), calculating the calibration power consumption (228) specified by the higher calibration dataset (220) at the calibration operating point matching the current operating point (210), and calculating the calibration power consumption (232) specified by the higher calibration dataset (220) at the calibration operating point matching the proposed operating point (226). The power estimation module may calculate each of the calibration power consumptions (228, 232) by providing the current operating point (210) and the proposed operating point (226) as inputs to a mathematical function representing the higher calibration dataset (220). In embodiments where the higher calibration dataset (220) is implemented using a table rather than a mathematical function, the power estimation module may calculate each of the calibration power consumptions (228, 232) by generating a mathematical function to model the data in the table, and then providing the current operating point (210) and the proposed operating point (226) as inputs to the mathematical function. The power estimation module may generate a mathematical function to model the calibration dataset in the table using a linear regression algorithm to derive an order N−1 polynomial equation to fit the N tuples of data in the table. Readers will note, however, that any other manner of generating a mathematical function to model the calibration dataset as will occur to those of skill in the art is also well within the scope of the present invention such as, for example, using a piecewise linear mathematical function. In a manner similar to the manner of calculating calibration power consumptions (228, 232) using the higher calibration dataset (220), the power estimation module may also calculate each of the calibration power consumptions (230, 236) using the lower calibration dataset (222).

The power estimation module may then determine (216) the estimated power consumption (218) at the proposed operating point in dependence upon the two calibration datasets (220, 222) according to the method of FIG. 2 by calculating the estimated power consumption (218) as the sum of the calibration power consumption 'Z' (236) specified by the lower calibration dataset (222) at the calibration operating point matching the proposed operating point (226) and the ratio of the difference 'A' between the current power consumption (206) and the calibration power consumption (230)

specified by the lower calibration dataset (222) at the calibration operating point matching the current operating point (210) to the difference 'B' between the calibration power consumption (228) specified by the higher calibration dataset (220) at the calibration operating point matching the current operating point (210) and the calibration power consumption (230) specified by the lower calibration dataset (222) at the calibration operating point matching the current operating point (210) times the difference 'C' between the calibration power consumption (232) specified by the higher calibration dataset (220) at the calibration operating point matching the proposed operating point (226) and the calibration power consumption (236) specified by the lower calibration dataset (222) at the calibration operating point matching the proposed operating point (226). That is, in FIG. 2 the estimated power consumption (218) is represented as follows:

$$P_{estimated\ consumption} = Z + A + B*C$$

The method of FIG. 2 also includes administering (219), by the power estimation module, the computing system in dependence upon the estimated power consumption. The power estimation module may administer (219) the computing system in dependence upon the estimated power consumption according to the method of FIG. 2 by displaying estimated power computer, performing power control within the computing system in conformity with the estimated power consumption, calculating a value based on the estimation power consumption, storing the estimation power consumption in computer memory, providing the estimated power consumption to some other device, or in any other way as will occur to those of skill in the art.

The description above with reference to FIG. 2 describes determining an estimated power consumption for the measured computing components using only two calibration datasets. While using two or less calibration datasets for some computing systems may yield the most accurate estimated power consumption, using more than two calibration datasets may yield the most accurate estimated power consumption for other computing systems. For further explanation, therefore, consider FIG. 3 that sets forth a flow chart illustrating a further exemplary method of estimating power consumption of computing components configured in a computing system according to embodiments of the present invention.

Figure 3:
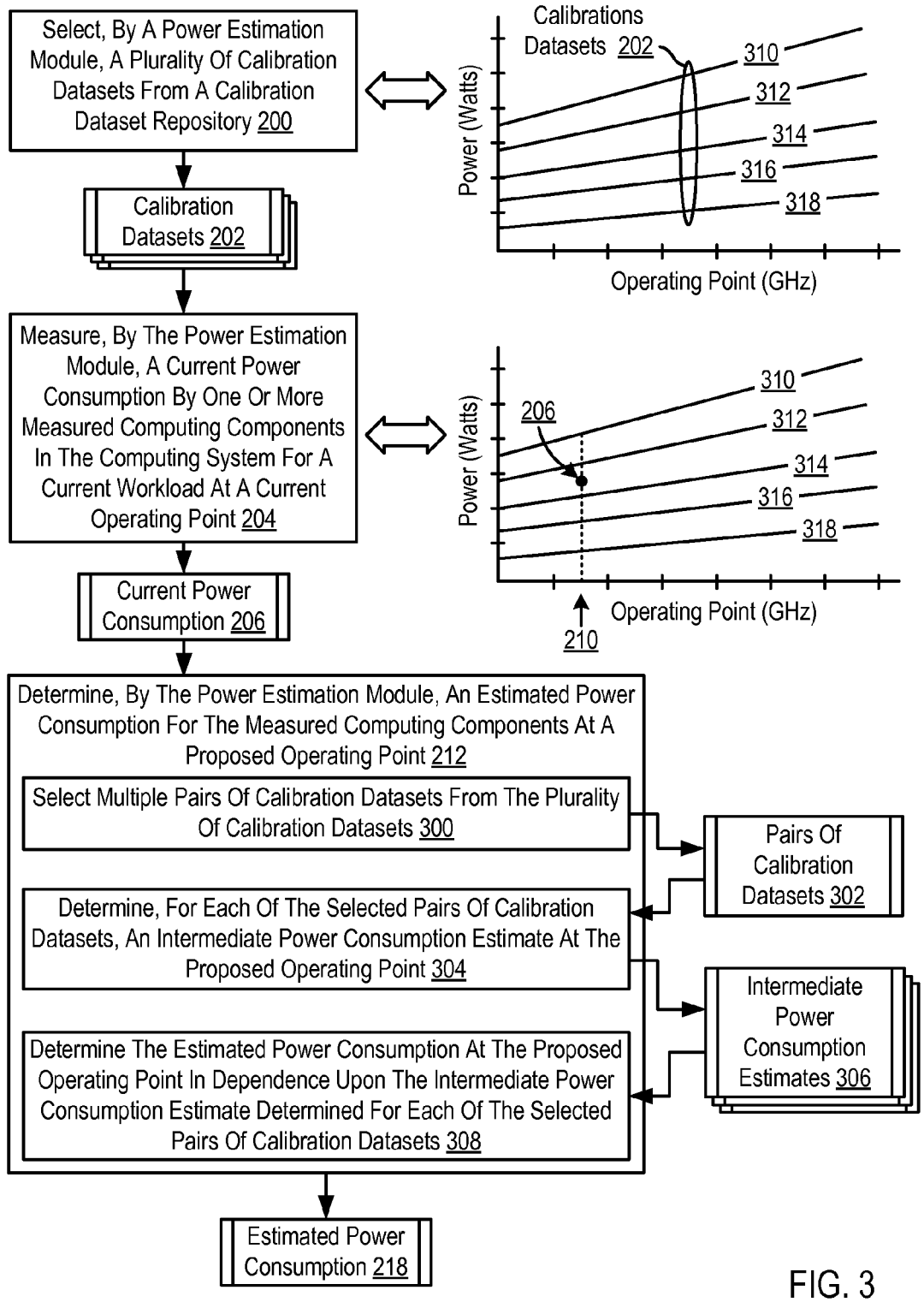
FIG. 3 sets forth a flow chart illustrating a further exemplary method of estimating power consumption of computing components configured in a computing system according to embodiments of the present invention.

The method of FIG. 3 is similar to the method of FIG. 2. That is, the method of FIG. 3 includes: selecting (200), by a power estimation module, a plurality of calibration datasets (202) from a calibration dataset repository, each calibration dataset (202) specifying calibration power consumption by one or more computing components in the computing system for a calibration workload at a plurality of calibration operating points; measuring (204), by the power estimation module, a current power consumption (206) by one or more measured computing components in the computing system for a current workload at a current operating point (210); and determining (212), by the power estimation module, an estimated power consumption (218) for the measured computing components at a proposed operating point in dependence upon the selected calibration datasets (202) and the current power consumption (206) for the current workload at the current operating point (210).

The method of FIG. 3 differs from the method of FIG. 2, however, in that the power estimation module determines (212) an estimated power consumption (218) for the measured computing components at a proposed operating point according to the method of FIG. 3 by selecting multiple pairs (302) of calibration datasets from the plurality of calibration datasets (202). The power estimation module may select multiple pairs (302) of calibration datasets from the plurality of calibration datasets (202) according to the method of FIG. 3 by selecting the closest calibration datasets (312, 314) above and below the current workload as a first pair, selecting the second closest calibration datasets (310, 316) above and below the current workload as a second pair, and so on. In other embodiments, the power estimation module may selecting multiple pairs (302) of calibration datasets from the plurality of calibration datasets (202) according to the method of FIG. 3 by randomly selecting the multiple pairs (302) of calibration datasets. In still other embodiments, the power estimation module may selecting multiple pairs (302) of calibration datasets from the plurality of calibration datasets (202) according to the method of FIG. 3 by selecting each pair based on different environmental parameter types. For example, selecting the first pair based temperature, the second pair based on humidity, and so on.

In the method of FIG. 3, determining (212), by the power estimation module, an estimated power consumption (218) for the measured computing components at a proposed operating point includes determining (304), for each of the selected pairs (302) of calibration datasets, an intermediate power consumption (306) estimate at the proposed operating point. The power estimation module may determine (304), for each of the selected pairs (302) of calibration datasets, an intermediate power consumption (306) estimate at the proposed operating point in a manner similar to the manner in which determining the estimated power consumption (218) at the proposed operating point in dependence upon the two calibration datasets is described above with reference to FIG. 2.

Determining (212), by the power estimation module, an estimated power consumption (218) for the measured computing components at a proposed operating point according to the method of FIG. 3 also includes determining (308) the estimated power consumption (218) at the proposed operating point in dependence upon the intermediate power consumption estimate (306) determined for each of the selected pairs (302) of calibration datasets. The power estimation module may determine (308) the estimated power consumption (218) at the proposed operating point in dependence upon the intermediate power consumption estimate (306) determined for each of the selected pairs (302) of calibration datasets according to the method of FIG. 3 by calculating the estimated power consumption (218) as the weighted average of the intermediate power consumption estimates (306). The weights used in the weighted average calculation may be selected such that the intermediate power consumption estimates (306) using the pair of calibration datasets closest to the current workload have a greater influence in the estimated power consumption (218) than the intermediate power consumption estimates (306) using other pairs of calibration datasets. Readers will note that calculating the estimated power consumption (218) as the weighted average of the intermediate power consumption estimates (306) is for explanation only and not for limitation. Other ways of calculating the estimated power consumption (218) using the intermediate power consumption estimates (306) as will occur to those of skill in the art may also be useful in estimating power consumption of computing components according to embodiments of the present invention.

Because power consumption for various components of a computing system may vary depending on environmental conditions, the power estimation module may select calibration datasets for determining estimated power consumption that were previously generated during similar environmental conditions. For further explanation, therefore, FIG. 4 sets forth a flow chart illustrating a further exemplary method of estimating power consumption of computing components configured in a computing system according to embodiments of the present invention in which the calibration data repository associates each stored calibration dataset with environmental parameters measured when each stored calibration dataset was created.

Figure 4:
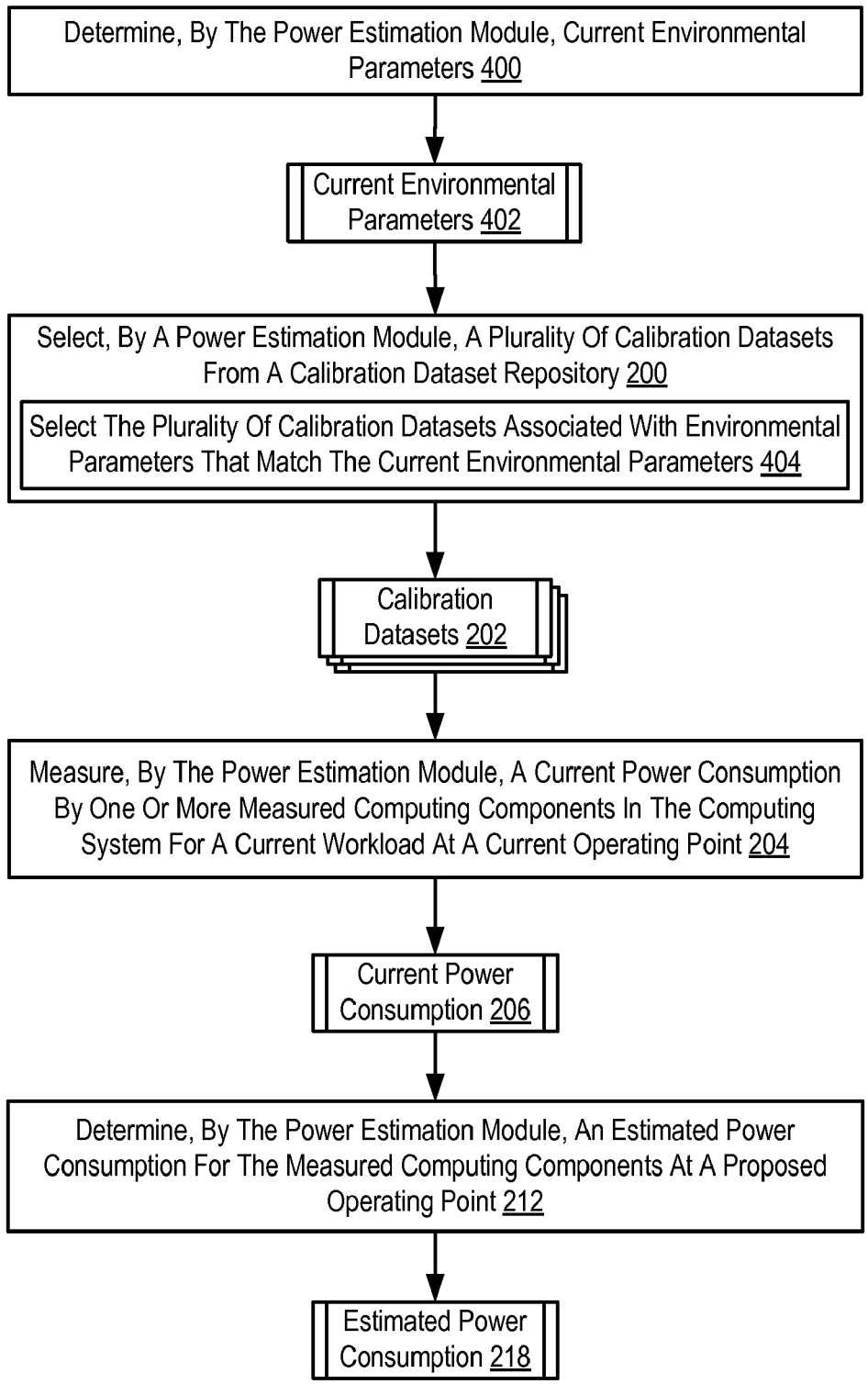
FIG. 4 sets forth a flow chart illustrating a further exemplary method of estimating power consumption of computing components configured in a computing system according to embodiments of the present invention.

The method of FIG. 4 is similar to the method of FIG. 2. That is, the method of FIG. 4 includes: selecting (200), by a power estimation module, a plurality of calibration datasets (202) from a calibration dataset repository, each calibration dataset (202) specifying calibration power consumption by one or more computing components in the computing system for a calibration workload at a plurality of calibration operating points; measuring (204), by the power estimation module, a current power consumption (206) by one or more measured computing components in the computing system for a current workload at a current operating point; and determining (212), by the power estimation module, an estimated power consumption (218) for the measured computing components at a proposed operating point in dependence upon the selected calibration datasets (202) and the current power consumption (206) for the current workload at the current operating point.

The method of FIG. 4, however, differs from the method of FIG. 2 in that the method of FIG. 4 includes determining (400), by the power estimation module, current environmental parameters (402). The power estimation module may determine (400) current environmental parameters (402) according to the method of FIG. 4 by retrieving the current environmental parameters (402) from an environmental sensor installed in the computing device. The environmental sensor may detect environmental parameters such as, for example, temperature, altitude, humidity, and so on.

In the method of FIG. 4, selecting (200), by a power estimation module, a plurality of calibration datasets (202) from a calibration dataset repository includes selecting (404) the plurality of calibration datasets (202) associated with environmental parameters that match the current environmental parameters (402). The power estimation module may select (404) the plurality of calibration datasets (202) associated with environmental parameters that match the current environmental parameters (402) according to the method of FIG. 4 by retrieving all of the calibration datasets having values for associated environmental parameters within a predetermined range of the values for the current environmental parameters (402). In other embodiments, the power estimation module may select (404) the plurality of calibration datasets (202) associated with environmental parameters that match the current environmental parameters (402) according to the method of FIG. 4 by retrieving the calibration datasets having values for associated environmental parameters that are the closest to the values for the current environmental parameters (402).

To further enhance the power estimation module's future ability to estimate power consumption according to embodiments of the present invention, the power estimation module may store additional calibration datasets to the calibration dataset repository as the computing system encounters new workloads. For further explanation, therefore, consider FIG. 5 that sets forth a flow chart illustrating a further exemplary method of estimating power consumption of computing components configured in a computing system according to embodiments of the present invention.

Figure 5:
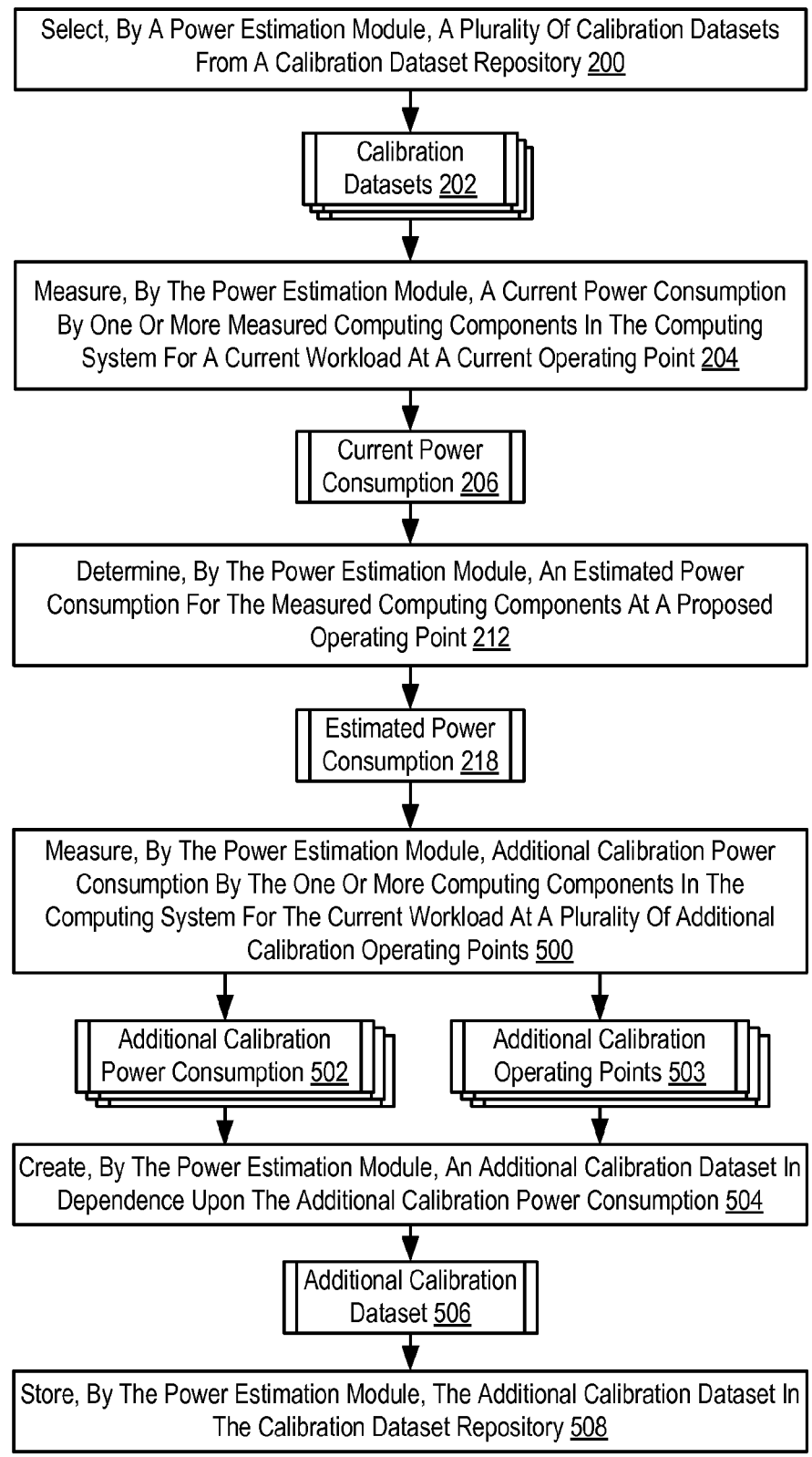
FIG. 5 sets forth a flow chart illustrating a further exemplary method of estimating power consumption of computing components configured in a computing system according to embodiments of the present invention.

The method of FIG. 5 is similar to the method of FIG. 2. That is, the method of FIG. 5 includes: selecting (200), by a power estimation module, a plurality of calibration datasets (202) from a calibration dataset repository, each calibration dataset (202) specifying calibration power consumption by one or more computing components in the computing system for a calibration workload at a plurality of calibration operating points; measuring (204), by the power estimation module, a current power consumption (206) by one or more measured computing components in the computing system for a current workload at a current operating point; and determining (212), by the power estimation module, an estimated power consumption (218) for the measured computing components at a proposed operating point in dependence upon the selected calibration datasets (202) and the current power consumption (206) for the current workload at the current operating point.

The method of FIG. 5 includes measuring (500), by the power estimation module, additional calibration power consumption (502) by the one or more computing components in the computing system for the current workload at a plurality of additional calibration operating points (503). The power estimation module may measure (500) the additional calibration power consumption (502) by the one or more computing components in the computing system for the current workload at a plurality of additional calibration operating points (503) according to the method of FIG. 5 by selecting the additional calibration operating points (503) and for each of the additional calibration operating points (503): configuring the computing system to operate at the additional calibration operating point (503) and determining the additional calibration power consumption (502) while the computer system operates at that additional calibration operating point (503). As mentioned above, the power estimation module may determine the additional calibration power consumption (502) using the voltage regulators supplying power to the measured components.

The method of FIG. 5 also includes creating (504), by the power estimation module, an additional calibration dataset (506) in dependence upon the additional calibration power consumption (502) for the current workload at the plurality of additional calibration operating points (503). The power estimation module may create (504) an additional calibration dataset (506) according to the method of FIG. 5 by associating the additional calibration power consumption (502) with its corresponding additional calibration operating points (503) in a table. In some other embodiments, the power estimation module may create (504) an additional calibration dataset (506) according to the method of FIG. 5 by generating a mathematical function to model the relationship between each value for additional calibration power consumption (502) and its corresponding additional calibration operating point (503). As mentioned above, the power estimation module may generating a mathematical function to model using a linear regression algorithm to derive an order N-1 polynomial equation to fit the N number of measurements for the additional calibration power consumption. Readers will note, however, that any other manner of generating a mathematical function as will occur to those of skill in the art is also well within the scope of the present invention such as, for example, using a piecewise linear mathematical function.

The method of FIG. 5 also includes storing (508), by the power estimation module, the additional calibration dataset (506) in the calibration dataset repository. The power estimation module may store (508) the additional calibration dataset (506) in the calibration dataset repository according to the method of FIG. 5 by creating a new storage image of the calibration dataset repository that includes the additional calibration dataset and flashing non-volatile computer memory with the new storage image of the calibration dataset repository. Readers will note that storing the additional calibration dataset in the calibration dataset repository as described above is for explanation only and not for limitation. When the calibration dataset repository is stored in other storage mediums, other ways of storing the additional calibration dataset in the calibration dataset repository as will occur to those of skill in the art may also be useful in estimating power consumption of computing components configured in a computing system according to embodiments of the present invention.

Exemplary embodiments of the present invention are described largely in the context of a fully functional computer system for estimating power consumption of computing components configured in a computing system. Readers of skill in the art will recognize, however, that the present invention also may be embodied in a computer program product disposed on a computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method of estimating power consumption of computing components configured in a computing system, the method comprising:
    selecting, by a power estimation module comprising one or more modules of automated computing machinery, a plurality of calibration datasets from a calibration dataset repository, each calibration dataset specifying calibration power consumption by one or more computing components in the computing system for a calibration workload at a plurality of calibration operating points, each calibration dataset specifying power consumption levels of the automated computing machinery at various operating points;
    measuring, by the power estimation module, a current power consumption by a plurality of measured computing components in the computing system for a current workload at a current operating point;
    determining, by the power estimation module, an estimated power consumption for the measured computing components at a proposed operating point in dependence upon the power consumption levels of the automated computing machinery at least one different operating point than the current operating point as indicated in the selected calibration datasets and in dependence upon the current power consumption for the current workload at the current operating point; and
    administering, by the power estimation module, the computing system in dependence upon the estimated power consumption.

2. The method of claim 1 wherein determining, by the power estimation module, an estimated power consumption for the measured computing components at a proposed operating point further comprises:
    selecting two calibration datasets from among the plurality of calibration datasets; and
    determining the estimated power consumption at the proposed operating point in dependence upon the two calibration datasets.

3. The method of claim 2 wherein:
    selecting two calibration datasets from among the plurality of calibration datasets further comprises selecting, from the plurality of calibration datasets, a lower calibration dataset and a higher calibration dataset, the lower calibration dataset specifying the calibration power consumption that is less than the current power consumption at the calibration operating point matching the current operating point, the higher calibration dataset specifying the calibration power consumption that is greater than the current power consumption at the calibration operating point matching the current operating point; and
    determining the estimated power consumption at the proposed operating point in dependence upon the two calibration datasets further comprises calculating the estimated power consumption as the sum of the calibration power consumption specified by the lower calibration dataset at the calibration operating point matching the proposed operating point and the ratio of the difference of the current power consumption and the calibration power consumption specified by the lower calibration dataset at the calibration operating point matching the current operating point to the difference of the calibration power consumption specified by the higher calibration dataset at the calibration operating point matching the current operating point and the calibration power consumption specified by the lower calibration dataset at the calibration operating point matching the current operating point times the difference of the calibration power consumption specified by the higher calibration dataset at the calibration operating point matching the proposed operating point and the calibration power consumption specified by the lower calibration dataset at the calibration operating point matching the proposed operating point.

4. The method of claim 1 wherein determining, by the power estimation module, an estimated power consumption for the measured computing components at a proposed operating point further comprises:
    selecting multiple pairs of calibration datasets from the plurality of calibration datasets;
    determining, for each of the selected pairs of calibration datasets, an intermediate power consumption estimate at the proposed operating point; and
    determining the estimated power consumption at the proposed operating point in dependence upon the intermediate power consumption estimate determined for each of the selected pairs of calibration datasets.

5. The method of claim 1 wherein:
the calibration data repository associates each stored calibration dataset with environmental parameters measured when each stored calibration dataset was created;
the method further comprises determining, by the power estimation module, current environmental parameters; and
selecting, by a power estimation module, a plurality of calibration datasets from a calibration dataset repository further comprises selecting the plurality of calibration datasets associated with environmental parameters that match the current environmental parameters.

6. The method of claim 1 further comprising:
measuring, by the power estimation module, additional calibration power consumption by the one or more computing components in the computing system for the current workload at a plurality of additional calibration operating points;
creating, by the power estimation module, an additional calibration dataset in dependence upon the additional calibration power consumption for the current workload at the plurality of additional calibration operating points; and
storing, by the power estimation module, the additional calibration dataset in the calibration dataset repository.

7. The method of claim 1, wherein the operating point indicates at least one of a clock frequency of a component, an instruction fetch rate limit of a processor, and an instruction issue rate limit of a processor.

8. Apparatus for estimating power consumption of computing components configured in a computing system, the apparatus comprising a computer processor, a computer memory operatively coupled to the computer processor, the computer memory having disposed within it computer program instructions capable of:
selecting, by a power estimation module comprising one or more modules of automated computing machinery, a plurality of calibration datasets from a calibration dataset repository, each calibration dataset specifying calibration power consumption by one or more computing components in the computing system for a calibration workload at a plurality of calibration operating points, each calibration dataset specifying power consumption levels of the automated computing machinery at various operating points;
measuring, by the power estimation module, a current power consumption by a plurality of measured computing components in the computing system for a current workload at a current operating point;
determining, by the power estimation module, an estimated power consumption for the measured computing components at a proposed operating point in dependence upon the power consumption levels of the automated computing machinery at least one different operating point than the current operating point as indicated in the selected calibration datasets and in dependence upon the current power consumption for the current workload at the current operating point; and
administering, by the power estimation module, the computing system in dependence upon the estimated power consumption.

9. The apparatus of claim 8 wherein determining, by the power estimation module, an estimated power consumption for the measured computing components at a proposed operating point further comprises:
selecting two calibration datasets from among the plurality of calibration datasets; and
determining the estimated power consumption at the proposed operating point in dependence upon the two calibration datasets.

10. The apparatus of claim 9 wherein:
selecting two calibration datasets from among the plurality of calibration datasets further comprises selecting, from the plurality of calibration datasets, a lower calibration dataset and a higher calibration dataset, the lower calibration dataset specifying the calibration power consumption that is less than the current power consumption at the calibration operating point matching the current operating point, the higher calibration dataset specifying the calibration power consumption that is greater than the current power consumption at the calibration operating point matching the current operating point; and
determining the estimated power consumption at the proposed operating point in dependence upon the two calibration datasets further comprises calculating the estimated power consumption as the sum of the calibration power consumption specified by the lower calibration dataset at the calibration operating point matching the proposed operating point and the ratio of the difference of the current power consumption and the calibration power consumption specified by the lower calibration dataset at the calibration operating point matching the current operating point to the difference of the calibration power consumption specified by the higher calibration dataset at the calibration operating point matching the current operating point and the calibration power consumption specified by the lower calibration dataset at the calibration operating point matching the current operating point times the difference of the calibration power consumption specified by the higher calibration dataset at the calibration operating point matching the proposed operating point and the calibration power consumption specified by the lower calibration dataset at the calibration operating point matching the proposed operating point.

11. The apparatus of claim 8 wherein determining, by the power estimation module, an estimated power consumption for the measured computing components at a proposed operating point further comprises:
selecting multiple pairs of calibration datasets from the plurality of calibration datasets;
determining, for each of the selected pairs of calibration datasets, an intermediate power consumption estimate at the proposed operating point; and
determining the estimated power consumption at the proposed operating point in dependence upon the intermediate power consumption estimate determined for each of the selected pairs of calibration datasets.

12. The apparatus of claim 8 wherein:
the calibration data repository associates each stored calibration dataset with environmental parameters measured when each stored calibration dataset was created;
the computer memory has disposed within it computer program instructions capable of determining, by the power estimation module, current environmental parameters; and
selecting, by a power estimation module, a plurality of calibration datasets from a calibration dataset repository further comprises selecting the plurality of calibration datasets associated with environmental parameters that match the current environmental parameters.

13. The apparatus of claim 8 wherein the computer memory has disposed within it computer program instructions capable of:
- measuring, by the power estimation module, additional calibration power consumption by the one or more computing components in the computing system for the current workload at a plurality of additional calibration operating points;
- creating, by the power estimation module, an additional calibration dataset in dependence upon the additional calibration power consumption for the current workload at the plurality of additional calibration operating points; and
- storing, by the power estimation module, the additional calibration dataset in the calibration dataset repository.

14. A computer program product for estimating power consumption of computing components configured in a computing system, the computer program product disposed in a computer readable recordable medium, the computer program product comprising computer program instructions capable of:
- selecting, by a power estimation module comprising one or more modules of automated computing machinery, a plurality of calibration datasets from a calibration dataset repository, each calibration dataset specifying calibration power consumption by one or more computing components in the computing system for a calibration workload at a plurality of calibration operating points, each calibration dataset specifying power consumption levels of the automated computing machinery at various operating points;
- measuring, by the power estimation module, a current power consumption by a plurality of measured computing components in the computing system for a current workload at a current operating point;
- determining, by the power estimation module, an estimated power consumption for the measured computing components at a proposed operating point in dependence upon the power consumption levels of the automated computing machinery at least one different operating point than the current operating point as indicated in the selected calibration datasets and in dependence upon the current power consumption for the current workload at the current operating point; and
- administering, by the power estimation module, the computing system in dependence upon the estimated power consumption.

15. The computer program product of claim 14 wherein determining, by the power estimation module, an estimated power consumption for the measured computing components at a proposed operating point further comprises:
- selecting two calibration datasets from among the plurality of calibration datasets; and
- determining the estimated power consumption at the proposed operating point in dependence upon the two calibration datasets.

16. The computer program product of claim 15 wherein:
- selecting two calibration datasets from among the plurality of calibration datasets further comprises selecting, from the plurality of calibration datasets, a lower calibration dataset and a higher calibration dataset, the lower calibration dataset specifying the calibration power consumption that is less than the current power consumption at the calibration operating point matching the current operating point, the higher calibration dataset specifying the calibration power consumption that is greater than the current power consumption at the calibration operating point matching the current operating point; and
- determining the estimated power consumption at the proposed operating point in dependence upon the two calibration datasets further comprises calculating the estimated power consumption as the sum of the calibration power consumption specified by the lower calibration dataset at the calibration operating point matching the proposed operating point and the ratio of the difference of the current power consumption and the calibration power consumption specified by the lower calibration dataset at the calibration operating point matching the current operating point to the difference of the calibration power consumption specified by the higher calibration dataset at the calibration operating point matching the current operating point and the calibration power consumption specified by the lower calibration dataset at the calibration operating point matching the current operating point times the difference of the calibration power consumption specified by the higher calibration dataset at the calibration operating point matching the proposed operating point and the calibration power consumption specified by the lower calibration dataset at the calibration operating point matching the proposed operating point.

17. The computer program product of claim 14 wherein determining, by the power estimation module, an estimated power consumption for the measured computing components at a proposed operating point further comprises:
- selecting multiple pairs of calibration datasets from the plurality of calibration datasets;
- determining, for each of the selected pairs of calibration datasets, an intermediate power consumption estimate at the proposed operating point; and
- determining the estimated power consumption at the proposed operating point in dependence upon the intermediate power consumption estimate determined for each of the selected pairs of calibration datasets.

18. The computer program product of claim 14 wherein:
- the calibration data repository associates each stored calibration dataset with environmental parameters measured when each stored calibration dataset was created;
- the computer program product further comprises computer program instructions capable of determining, by the power estimation module, current environmental parameters; and
- selecting, by a power estimation module, a plurality of calibration datasets from a calibration dataset repository further comprises selecting the plurality of calibration datasets associated with environmental parameters that match the current environmental parameters.

19. The computer program product of claim 14 further comprising computer program instructions capable of:
- measuring, by the power estimation module, additional calibration power consumption by the one or more computing components in the computing system for the current workload at a plurality of additional calibration operating points;
- creating, by the power estimation module, an additional calibration dataset in dependence upon the additional calibration power consumption for the current workload at the plurality of additional calibration operating points; and
- storing, by the power estimation module, the additional calibration dataset in the calibration dataset repository.

* * * * *